May 1, 1956 W. H. ARMISTEAD 2,743,553
METAL SEALING GLASS AND SEAL
Filed Nov. 26, 1951
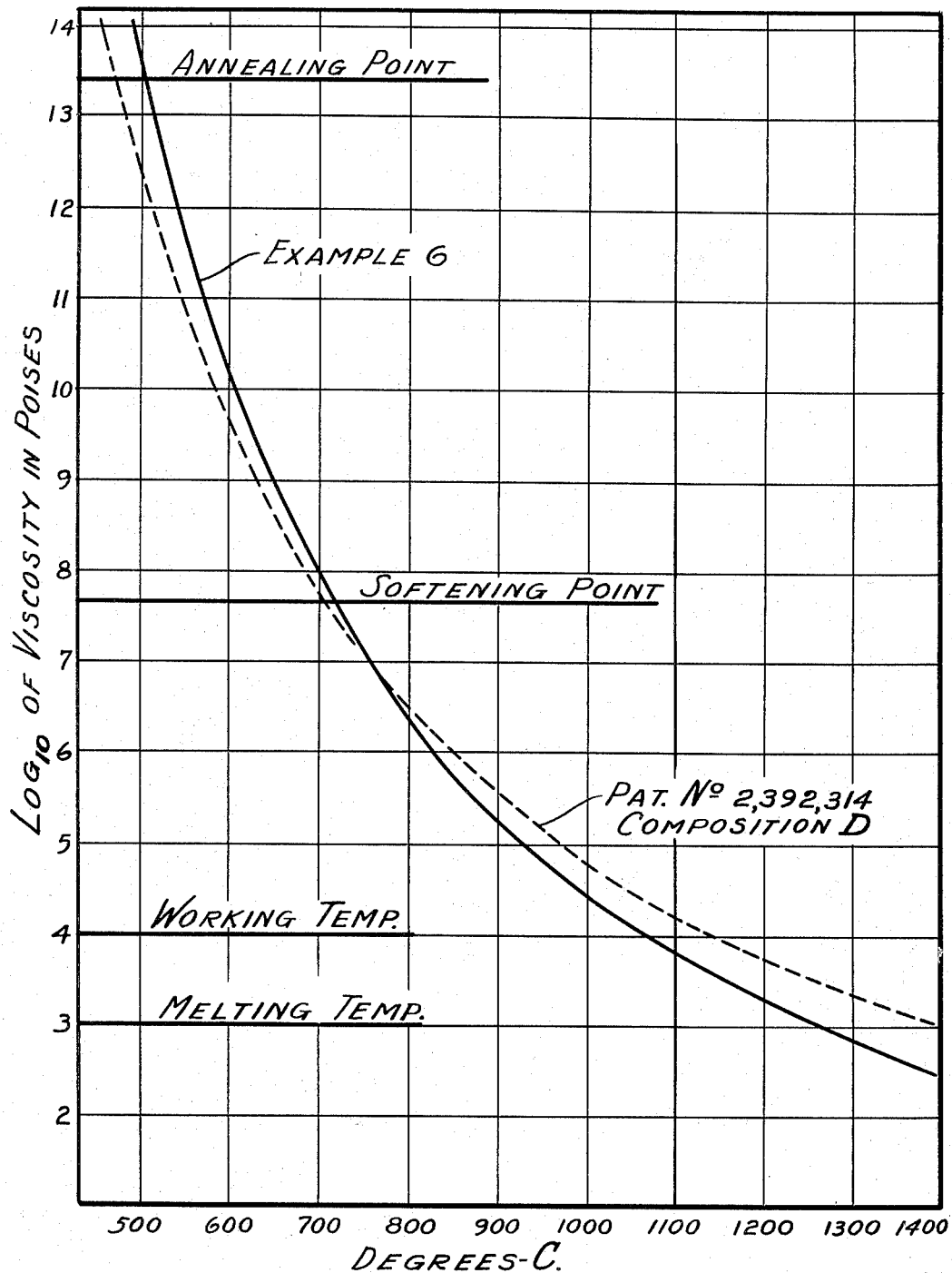
INVENTOR.
WILLIAM H. ARMISTEAD
BY
ATTORNEY.

United States Patent Office 2,743,553
Patented May 1, 1956

2,743,553

METAL SEALING GLASS AND SEAL

William H. Armistead, Corning, N. Y., assignor to Corning Glass Works, Corning, N. Y., a corporation of New York Application November 26, 1951, Serial No. 258,163

8 Claims. (Cl. 49—92.5)

This invention relates to glass compositions which are suitable for making fusion seals with alloys of iron comprising essentially nickel, cobalt and iron, such as "Kovar" (29 parts nickel, 17 parts cobalt, 0.3 part manganese and 53.7 parts iron) and "Fernico" (28 parts nickel, 18 parts cobalt and 54 parts iron). Such seals are particularly intended for use in the manufacture of electronic discharge tubes such as power tubes, image orthicon tubes, iconoscope tubes, and the like.

Patent No. 2,392,314 issued to R. H. Dalton January 8, 1946, describes compositions for glasses having thermal-expansion characteristics and other physical and chemical properties making them advantageously useful for sealing with such alloys. Such compositions comprise essentially 60 to 75% $SiO_2$, 10 to 20% $B_2O_3$, 5 to 10% $Al_2O_3$, up to 5% $K_2O$ and up to 2% $Li_2O$, with or without not over 3% $Na_2O$. While such glasses represent an advance over previous borosilicate glasses utilized for making such seals, they have not been entirely satisfactory in meltability. In particular, their melting and working temperatures are too high to permit efficient melting and fining thereof in tank furnaces for delivery by automatic feeders for fabrication by automatic machinery. (The melting temperature of a glass is the temperature at which its viscosity becomes less than $10^3$ poises, and its working temperature is the temperature at which its viscosity is $10^4$ poises.) Moreover, the setting and annealing points of such glasses are not so high as is desirable in order that electronic tubes comprising such glass-to-metal seals may be baked out during evacuation without distortion of the glass at the higher temperatures now being utilized for this purpose.

Attempts to soften the glasses described in such patent by increasing their flux contents (alkali metal oxides, $B_2O_3$ and also fluorides) result either in an objectionable increase in their thermal expansion coefficient or a deterioration of their chemical durability if they are heated too long or cooled too slowly near their annealing points. In this connection, it is well known that alkali metal borosilicate glasses within certain ranges of compositions undergo a molecular change or phase separation if heated long enough at temperatures between their strain and softening points and that a glass of such composition is converted by such heat treatment to an interdispersed mixture of two distinct compositions or phases, one of which is soluble. The borosilicate glasses which have in the past been utilized for making fusion seals with nickel-cobalt-iron alloys frequently lie within such unstable composition ranges and when they are annealed they oftentimes become chemically unstable as a result of such molecular change and their surfaces are thereafter susceptible to attack by atmospheric moisture. Surfaces so affected bubble and froth when the glass is fused to the metal thereby producing a weak and unsightly seal.

Such tendency towards decrease in chemical durability of the borosilicate sealing glasses disclosed in Patent No. 2,392,314 when heated, is normally counteracted and prevented by the essential presence in their compositions of a relatively large percentage (5 to 10%) of $Al_2O_3$ which is known generally to improve the chemical durability of a glass, but also in substantially large amounts to generally increase the melting temperature of a glass. However, the presence in such glasses of $Li_2O$, characterized by a high fluxing power, tends to compensate any such increase in melting point. On the other hand, it is to be noted that the amount of $K_2O$ in such glasses is restricted to not over 5% in view of its lower fluxing power as compared to either $Li_2O$ or $Na_2O$.

I have now discovered that if the range of compositions disclosed in Patent No. 2,392,314 is modified by decreasing the $Al_2O_3$ content to 1 to 4% and increasing the $K_2O$ content to 6 to 10.5%, the viscosities of the glasses in the temperature range 1000°–1400° C. (essentially the melting and working temperatures) are substantially decreased and their viscosities in the temperature range up to 600° C. (essentially the setting and annealing points) are unexpectedly increased. At the same time there is no objectionable change in their thermal expansion coefficient and normal chemical durability. On the contrary the chemical durability as affected by heat treatment is improved because the new glasses are outside of the unstable composition range and their stability is thus unaffected by heat treatment.

The improved glasses of this invention comprise essentially 65% to 75% $SiO_2$, 15% to 22% $B_2O_3$, 1% to 4% $Al_2O_3$, and at least two alkali metal oxides in the indicated proportions selected from the group consisting of 6% to 10.5% $K_2O$, up to 2% $Na_2O$ and 0.2% to 1.5% $Li_2O$, the selected alkali metal oxides including $K_2O$ and $Li_2O$, the total alkali metal oxides being 7.5% to 11%, the total of the essential constituents being at least 95%.

Preferably they comprise essenetially 68% to 71% $SiO_2$, 16% to 19% $B_2O_3$, 2% to 3.5% $Al_2O_3$, and at least two alkali metal oxides in the indicated proportions selected from the group consisting of 6% to 10.5% $K_2O$, up to 1% $Na_2O$ and 0.5% to 1.5% $Li_2O$, the selected alkali metal oxides including $K_2O$ and $Li_2O$, the total alkali metal oxides being 7.5% to 11%, the total of the essential constituents being at least 95%.

Other compatible glass-making constituents may be present including fining agents such as the oxides of arsenic and antimony, sulfate salts, and halogen compounds, or the bivalent oxides of the metals of the second periodic group and lead, but should not total more than 5%. However, the presence of fluorine and the bivalent metal oxides is generally undesirable except as they may be present as unavoidable impurities derived from such raw materials as, for example, spodumene which may be uesd as a cheap source of $Li_2O$.

The following compositions calculated in weight percent from their respective batches will illustrate the invention:

|  | 1 | 2 | 3 | 4 | 5 | 6 | 7 | 8 | 9 |
|---|---|---|---|---|---|---|---|---|---|
| $SiO_2$ | 70.4 | 70.4 | 68.5 | 69.9 | 70.25 | 69.35 | 68.25 | 74.25 | 66.5 |
| $B_2O_3$ | 20.1 | 18.1 | 20.25 | 18.1 | 18 | 18 | 18 | 15 | 22 |
| $Al_2O_3$ | 2 | 4 | 3 | 3 | 3 | 3.15 | 3 | 1 | 2 |
| $K_2O$ | 7.25 | 6.5 | 7.5 | 6.25 | 6.5 | 8.25 | 10 | 9 | 9 |
| $Na_2O$ |  |  |  |  | 1 | 0.5 |  |  |  |
| $Li_2O$ | 0.25 | 1 | 0.75 | 0.75 | 1.25 | 0.75 | 0.75 | 0.75 | 0.50 |

As a fining agent approximately 0.5% $As_2O_3$ may be included in each of the above compositions; substantial amounts of this will be lost during melting, and the residue has substantailly no effect upon the physical and chemical properties of the glass.

The glasses of this invention have the general physical and chemical properties which are essential for the successful production of fusion seals with nickel-cobalt-iron alloys. Moreover as compared with the glasses disclosed in Patent No. 2,392,314, the present glasses also have in general higher maximum annealing and setting points, lower minimum melting and working temperatures, and a greater maximum electrical resistivity at 350° C. Such differences in properties are entirely due to the differences between these and such prior glasses in $Al_2O_3$ and $K_2O$ contents, which differences have been pointed out above.

The improved chemical durability of the present glasses when heat-treated is due to their relatively high $K_2O$ conetnt which substantially places them in a thermally stable composition range. Such stability would be objectionably impaired if the $K_2O$ content were decreased below 6%. On the other hand, a content of more than 10.5% of $K_2O$ causes too great an increase in thermal expansion coefficient for successful seals.

Such substitution of $K_2O$ for some of the $Al_2O_3$ of the prior glasses has the surprising result that while the glass is thereby softened in the neighborhood of its melting and working temperatures, as might be expected, it is hardened in its annealing range and has its annealing point substantially increased contrary to expectations.

For illustration reference is had to the accompanying drawing which shows the curves representing the variation of viscosity with temperature for Example 6 of the present application and composition D of Patent No. 2,392,314. It will be noted that the curves cross in the neighborhood of the softening points of the two glasses and that the melting temperature of Example 6 is about 1260° C. which is 130° lower than that of composition D, but that the annealing point of Example 6 is about 505° C. which is 27° higher than that of composition D. Comparable differences are exhibited throughout the range of compositions of the present glasses as compared with the other glasses disclosed in the Dalton patent.

The presence of more than 4% $Al_2O_3$ in the glasses of this invention objectionably increases the melting temperature. At least 1% of $Al_2O_3$ is required, however, for adequate normal chemical durability.

The electrical resistivity of the glasses of this invention measred at 350° C. ranges from 30 to 500 megohm-cm. Such high resistivities are due to the high $K_2O$ and low $Na_2O$ contents of the glasses, in which regard they differ substantially from the prior glasses. Desirably $Na_2O$ should be less than 1%. If the $Na_2O$ content is raised above 2%, the electrical resistivity is objectionably decreased.

At least 0.2% of $Li_2O$ is essential in the present glasses to maintain easy meltability, but more than 1.5% $Li_2O$ causes loss of chemical durability when the glass is annealed and also lowers the electrical resistivity.

An excess of $SiO_2$ or a deficiency of $B_2O_3$ hardens the glass objectionably, but a deficiency of $SiO_2$ or an excess of $B_2O_3$ lowers its normal chemical durability.

What I claim is:

1. A glass which consists essentially of 65% to 75% $SiO_2$, 15% to 22% $B_2O_3$, 1% to 4% $Al_2O_3$, and at least two alkali metal oxides including $K_2O$ and $Li_2O$ in the indicated proportions selected from the group consisting of 6% to 10.5% $K_2O$, up to 2% $Na_2O$ and 0.2% ot 1.5% $Li_2O$, the total alkali metal oxides being 7.5% to 11%.

2. A glass which consists essentially of 65% to 75% $SiO_2$, 15% to 22% $B_2O_3$, 1% to 4% $Al_2O_3$, 6 to 10.5% $K_2O$, and 0.2% to 1.5% $Li_2O$, the total alkali metal oxides being 7.5% to 11%.

3. A glass which consists essentially of 65% to 75% $SiO_2$, 15% to 22% $B_2O_3$, 1% to 4% $Al_2O_3$, 6% to 10.5% $K_2O$, up to 2% $Na_2O$ and 0.2% to 1.5% $Li_2O$, the total alkali metal oxides being 7.5% to 11%.

4. A glass which consists essentially of 68% to 71% $SiO_2$, 16% to 19% $B_2O_3$, 2% to 3.5% $Al_2O_3$, 6% to 10.5% $K_2O$, and 0.5% to 1.5% $Li_2O$, the total alkali metal oxides being 7.5% to 11%.

5. A glass which consists essentially of 68% to 71% $SiO_2$, 16% to 19% $B_2O_3$, 2% to 3.5% $Al_2O_3$, 6% to 10.5% $K_2O$, up to 1% $Na_2O$, and 0.5% to 1.5% $Li_2O$, the total alkali metal oxides being 7.5% to 11%.

6. A vacuum-tight seal between the glass as defined in claim 1 and an alloy of iron comprising essentially nickel, cobalt and iron and having a thermal expansion coefficient compatible with that of the glass between room temperature and the setting point of the glass.

7. A vacuum-tight seal between the glass as defined in claim 1 and an alloy comprising essentially nickel, cobalt, manganese and iron in about the proportions of 29 parts nickel, 17 parts cobalt, 0.3 part manganese and 53.7 parts iron.

8. A vacuum-tight seal between the glass as defined in claim 1 and an alloy comprising essentially nickel, cobalt and iron in about the proportions of 28 parts nickel, 18 parts cobalt and 54 parts iron.

References Cited in the file of this patent
UNITED STATES PATENTS

| | | |
|---|---|---|
| 2,219,573 | Fraenckel | Oct. 29, 1940 |
| 2,279,831 | Lempert et al. | Apr. 14, 1942 |
| 2,392,314 | Dalton | Jan. 8, 1946 |
| 2,570,020 | Armistead | Oct. 2, 1951 |